July 27, 1943.   L. T. BARNES   2,325,298
BIMETALLIC PISTON RING
Filed Aug. 14, 1940
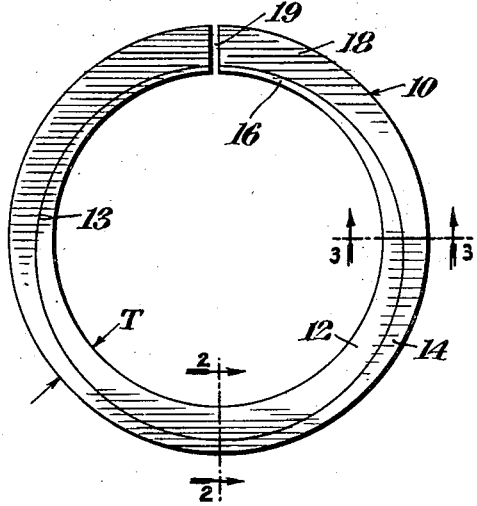
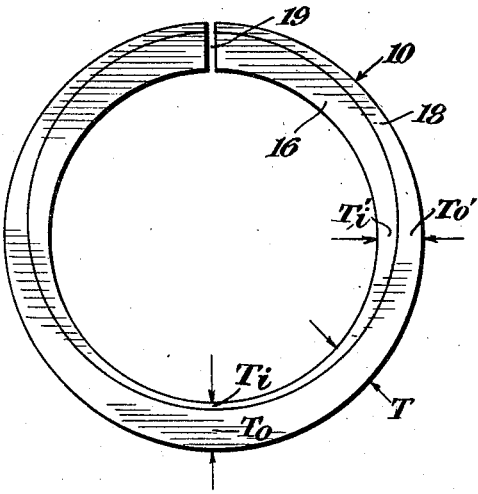
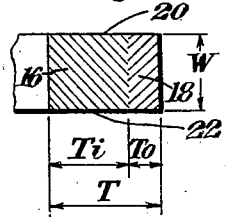
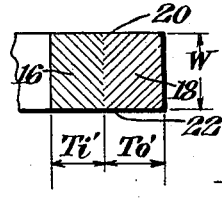
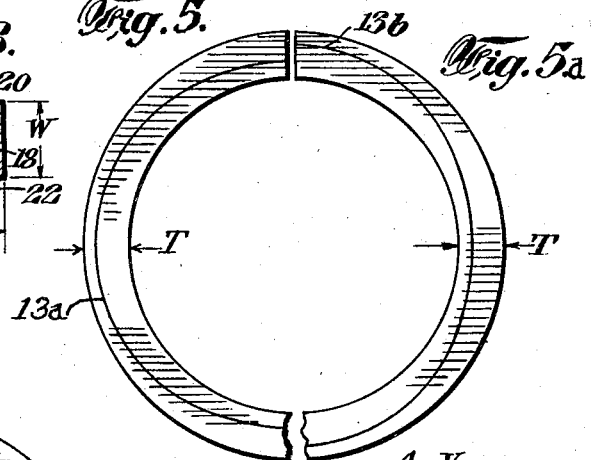
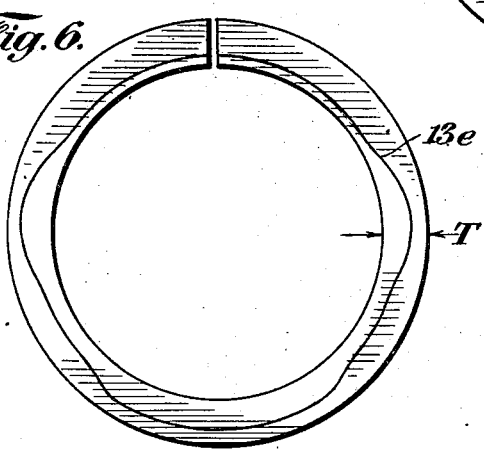
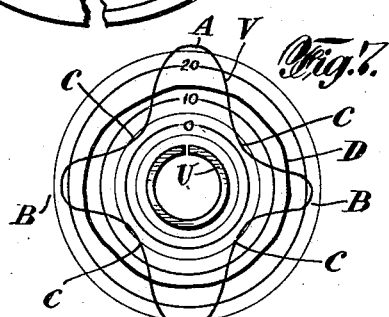
INVENTOR
Llewellyn T. Barnes
BY Benjamin Kahn
ATTORNEY Patented July 27, 1943

2,325,298

UNITED STATES PATENT OFFICE 2,325,298

BIMETALLIC PISTON RING

Llewellyn T. Barnes, Hempstead, N. Y.

Application August 14, 1940, Serial No. 352,483

9 Claims. (Cl. 309—44)

This invention relates to composite bi-metallic piston-rings of the single split type.

One of the objects is to provide a one-piece single-split piston-ring of the above character, the component parts of which are integrally-united and of different heat-expansion characteristics, to give more uniform radial pressure throughout the circumference of the cylindrical cylinder contacting surface.

More particularly it is the object of my invention to provide a piston-ring capable of maintaining the said advantage over wide temperature changes as encountered in operation in a cylinder of an internal combustion engine.

Another object is to provide a piston-ring which operates at circumferentially uniform radial pressure during periods of low operating speeds and high viscosity of the cylinder lubricant and at a different but still uniform radial pressure at higher reciprocating speeds or lower viscosity of the engine lubricant.

Within the principle of my invention it is contemplated to provide piston-rings capable of improved operation under varying conditions of heat and varying viscosity of the cylinder lubricant. By proper design, piston-rings affording optimum operating conditions to concurrent but different specific requirements are obtainable. The optimum independent requirements of varying operating temperatures and the optimum independent requirements of accompanying varying viscosity of the lubricant are not regularly related. These irregular requirements are however consistent within the operating range and therefor, with piston-rings of my improved design, it is possible to obtain optimum equal radial pressures throughout such operating range.

With these and other objects in view as will hereinafter appear as the description proceeds, reference will be had to the accompanying drawing, illustrating typical embodiments of the principles of my invention, in which:

Fig. 1 is an elevational view of one form of a complete piston-ring.

Fig. 2 is a section on line 2—2 of Fig. 1.

Fig. 3 is a section on line 3—3 of Fig. 1.

Fig. 4 is an elevational view similar to Fig. 1 of another form of my invention. Figs. 5 and 5a are fragmentary elevational views of further modified forms. Fig. 6 is an elevational view of still another form.

Fig. 7 is a radial pressure graph showing by comparison the main objective of my invention.

Referring to Figs. 1, 2, and 3, the piston-ring as a whole is designated by reference character 10 and is comprised of two nested ring-sections 12 and 14. The outer surface of the inner ring-section 12 is fused or otherwise integrally united to the inner surface of the outer ring-section 14 throughout the common and congruent bonding surface 13 so as to form what is commonly known as a one-piece piston-ring as distinguished from other bi-metallic or other composite rings wherein the ring-sections are not bonded or integrally united and those that are united only locally as by rivets or spot welding or the like. The piston-ring is essentially of the single-split type, the split being provided to form a gap 19 to permit expansion and contraction in response to temperature changes encountered in operation. The cross-sectional outline of the piston-ring 10, as shown in Figs. 2 and 3, is substantially rectangular and is formed by the parallel inner and outer cylindrical surfaces 16 and 18 respectively, and the parallel upper and lower plane surfaces 20 and 22 respectively of the ring as a whole. These surfaces are comprised of the combined respective adjacent upper and the lower surfaces of the ring-sections. These ring-sections are shown as being of equal width W on the inside and outside providing land engaging surfaces arranged in same corresponding upper and lower planes. These surfaces 20 and 22 are commonly referred to as land surfaces because, in function, they cooperate with or land on, the land surfaces of the piston grooves. The grooves may be slightly V shaped, and the piston ring surfaces may be made to fit accordingly but the important objective of equal total radial thickness throughout must be maintained.

The ring section 12 is of different heat-expansion characteristic than that of the ring-section 14. In some cases it is desirable that the inner have a greater coefficient of expansion and in some cases it has been found desirable that the outer have the greater coefficient. This will be more fully explained later. However, under varying temperatures of operation the outer surface 18 of the described form of piston-ring will exert correspondingly varying radial pressure upon the cylinder walls, the pressure increasing when the inner ring-section is of metal of higher coefficient of expansion and vice versa.

As seen in Fig. 1 the outline of the outer cylindrical surface 18 is circular and the outline of the inner cylindrical surface 16 is also circular. These outlines are concentric. The land surfaces 20 and 22 are therefor annularly uniform and react flush and with uniformly distributed contact against the walls of the grooves in the piston.

Also as seen in Fig. 1, the outline of the bonding surface 13 between the integrally-united ring-sections 12 and 14 is circular and eccentric to the inner and outer surfaces of the ring-sections 12 and 14.

The radial thickness of the piston-ring 10, is uniform throughout its circumference, that is, the overall thickness T of the combined ring-sections 12 and 14 at all points in the circumference is uniform.

Referring to Figs. 2 and 3, it will be seen that thickness $Ti$, $To$ and $Ti'$, $To'$ of the respective inner and outer component ring-sections at any given cross-sectional plane are complementary with respect to the overall thickness of the piston-ring. This rectangular cross-sectional construction provides uniform masses throughout the circumference of the piston-ring subjecting the piston groove lands to uniform inertia forces and reacting uniformly with maximum load distribution and minimum unit compression under forces to which it is subject.

In Fig. 1 it will be noted that the thinnest part of the inner ring is at the gap. In Fig. 4 however, the thinnest part of the inner ring is at a point opposite the gap. The dimension $Ti$ and $To$ at any cross sectional point of course being optional and depending upon the variation of radial pressure desired. In any event the variation of radial pressure is uniform throughout the circumference inasmuch as the dimension $Ti$ and $To$ vary uniformly. The thickness difference between the two metals is an important factor in expansion.

Referring to Fig. 7 showing a circular pressure diagram, the curve V indicates the effect of increase of an ordinary unitary metallic split ring of the type illustrated in the diagram at U. Highest pressures of this type of ring are in zones A, one adjacent the gap and the other zone diametrically opposite the gap. It will be further noted that at opposite zones B, at right angles to the zones A the pressure is lower than at A, and that at the four zones C, intermediate the zones A and B, the pressure is lowest. In some rings there is no pressure at all at these zones C and the ring is actually spaced from the cylinder. While this curve V is only typical of this criss-cross character, similar but somewhat irregular outlines are the plotted results of nearly all split one-piece unitary metal rings. The plotted curves of rings made in accordance with this invention are of substantial circular form even though slightly irregular. The percentage variation of the mean pressure, as illustrated, under given conditions does not vary greatly from the extreme pressures throughout the circumference of the plotted curve D of the subject rings.

In some applications as in pumping air-pistons wherein the loss due to bi-pass is not material and it is more desirable to equalize the ring forces and to decrease the rubbing pressure rather than to seal against blow-by, it may be more desirable to use a ring having the thermostatic ring-section on the outside so as to reduce the radial pressure of the contacting surfaces under increase temperature of operation. In the type illustrated in Fig. 5, of which only the left half is shown, the right half being understood as symmetrical thereto, the bonding surface 13a is eliptical in outline wherein changes of thickness of the component ring-sections occur at that gap, at the point opposite the gap, and at opposite points 90 degrees from the gap. In other words, the inner section is shown as thinnest at the gap and the point opposite and becomes increasingly thicker at diametrically opposite points 90 degrees from the gap and from the point opposite the gap. It is also possible to provide, under certain circumstances a most effective ring wherein the major axis of the bonding ellipse is vertical as indicated by the line 13b in Fig. 5a, showing only the right half of such a ring, the left half being understood as symmetrical thereto. In special cases, for example wherein the piston is hot at certain points in the circumference, it may be desirable to provide a bonding surface of irregular outline, as at 13e, Fig. 6, the thickness of the sections varying irregularly but designed to give overall optimum radial pressures throughout the rubbing circumference of the ring under specific conditions, the irregularity of the outline being symmetrical on either side of the gap.

Having thus described the principles of my invention in connection with the illustrated embodiments thereof, it is of course to be understood that other modifications may be had and minor changes may be made without departing from the principles of the invention as defined in the claims.

I claim:

1. A one-piece single-split piston ring comprising two integrally-united nested ring-sections of different heat-expansion characteristics, said sections being bonded throughout their entire common contacting surfaces, the cross-sectional outline at all points of said piston-ring as a whole being identical, and the radial thickness of each of the composite ring-sections differing, complementarily with respect to said outline at different cross-sectional points.

2. A one-piece single-split piston ring comprising two integrally-united nested ring-sections of different heat-expansion characteristics, said sections being bonded throughout their entire common contacting surfaces, said ring sections together being of equal radial thickness but individually varying in radial thickness, at different transverse sectional points.

3. A one-piece single-split piston ring comprising two integrally-united nested ring-sections of different heat-expansion characteristics, said sections being bonded throughout their entire common contacting surfaces, said sections being of equal width and varying radial thickness, the radial thickness of one of the ring-sections being greatest at the free ends of the piston-ring and thinnest at the point opposite the ends, and the other ring-section being thinnest at the ends and thickest at the points opposite the ends the combined thickness of both sections being at any point the same as at any other point.

4. A one-piece single-split piston ring comprising two integrally-united ring-sections of different heat-expansion characteristics, said sections being bonded throughout their entire common contacting surfaces, said piston-ring having flush land surfaces extending across both sections and providing parallel cylindrical inside and outside surfaces, a common bonding area of irregular cylindrical outline between the said inside and outside cylindrical surfaces, the walls of said bonding area being axially parallel to said cylindrical surfaces.

5. A one-piece single-split piston ring comprising two integrally-united nested ring sections of different heat-expansion characteristics, said sections being bonded throughout their entire common contracting surfaces, the thickness of each of said ring sections at points along its length varying relative to the thickness of the other throughout its length, and the total radial thickness of the ring as a whole at any given point equal to the radial thickness at any other point, each of said sections providing land surfaces of equal area on opposite sides of the ring.

6. A one-piece single-split piston ring comprising two integrally-united nested ring sections of different heat-expansion characteristics, said sections being bonded throughout their entire contacting surfaces, each of said ring sections providing a portion of the area of land surfaces on opposite sides of the ring, the radial thickness of each of the ring sections varying regularly and symmetrically from their ends at the split to a point opposite, and the total radial thickness of the ring as a whole being equal at all points in its circumference.

7. A one-piece single-split piston ring comprising two integrally-united ring-sections of different heat-expansion characteristics, said sections being bonded throughout their entire common contacting surfaces, said piston ring having flush land surfaces extending across both sections and providing parallel cylindrical inside and outside surfaces, a common bonding area of cylindrical outline but eccentrically disposed between the said inside and outside cylindrical surfaces, the walls of said bonding area being axially parallel to said cylindrical surfaces.

8. A one-piece single-split piston ring comprising two integrally-united nested ring sections of different heat-expansion characteristics, said sections being bonded throughout their entire common contacting surfaces, and being of equal width at their juncture, the radial thickness of the combined sections being uniform throughout the circumference of the ring, and the respective sections having varying and complementary radial thicknesses.

9. A one-piece split piston ring comprising outer and inner ring sections of different physical properties, continuously bonded together in an integrated unit having uniform radial thickness; each section having progressively diminishing radial thickness complementing progressively increasing radial thickness of the other section.

LLEWELLYN T. BARNES.